United States Patent
Shiho

(10) Patent No.: US 9,400,926 B2
(45) Date of Patent: Jul. 26, 2016

(54) IMAGE PROCESSING APPARATUS, IMAGE PROCESSING METHOD, AND NON-TRANSITORY COMPUTER READABLE MEDIUM

(71) Applicant: FUJI XEROX CO., LTD., Minato-ku, Tokyo (JP)

(72) Inventor: Yuichi Shiho, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 36 days.

(21) Appl. No.: 14/274,080

(22) Filed: May 9, 2014

(65) Prior Publication Data
US 2015/0161462 A1  Jun. 11, 2015

(30) Foreign Application Priority Data
Dec. 11, 2013  (JP) .................................. 2013-255806

(51) Int. Cl.
*G06K 9/46* (2006.01)
*G06K 9/32* (2006.01)
*G06K 9/00* (2006.01)

(52) U.S. Cl.
CPC ........ *G06K 9/00449* (2013.01); *G06K 9/00476* (2013.01); *G06K 9/3208* (2013.01); *G06K 2009/4666* (2013.01)

(58) Field of Classification Search
CPC ......... G06K 9/18; G06K 9/186; G06K 9/228; G06K 2009/01; G06K 9/03
USPC .......................... 382/182–197, 243, 309, 294
See application file for complete search history.

(56) References Cited

U.S. PATENT DOCUMENTS

| | | | |
|---|---|---|---|
| 7,136,526 B2 * | 11/2006 | Hotta et al. .................... | 382/187 |
| 7,471,848 B2 * | 12/2008 | Fujimoto et al. ............... | 382/275 |
| 8,036,463 B2 * | 10/2011 | Shimodaira .................... | 382/176 |
| 8,418,050 B2 * | 4/2013 | Minagawa et al. ............. | 715/221 |
| 2008/0024501 A1 * | 1/2008 | Yamakado et al. ........... | 345/443 |
| 2013/0110649 A1 * | 5/2013 | Sugiura et al. .............. | 705/14.73 |

FOREIGN PATENT DOCUMENTS

| | | | |
|---|---|---|---|
| JP | 08-202887 A | | 8/1996 |
| JP | 09-288714 | * | 4/1997 |
| JP | 09-288714 A | | 11/1997 |

* cited by examiner

*Primary Examiner* — Sheela C Chawan
(74) *Attorney, Agent, or Firm* — Sughrue Mion, PLLC

(57) ABSTRACT

An image processing apparatus determines an orientation of an image according to acquired image information. The image processing apparatus includes an image information acquiring unit, a character string extracting unit, and an image orientation determining unit. The image information acquiring unit acquires image information. The character string extracting unit extracts a character string existing in a rectangular region surrounded by ruled lines or ruled lines and a periphery of the image in a partial area that is a part of the image and that meets a predetermined condition. The image orientation determining unit determines an orientation of the image according to a direction of the character string extracted by the character string extracting unit.

12 Claims, 7 Drawing Sheets

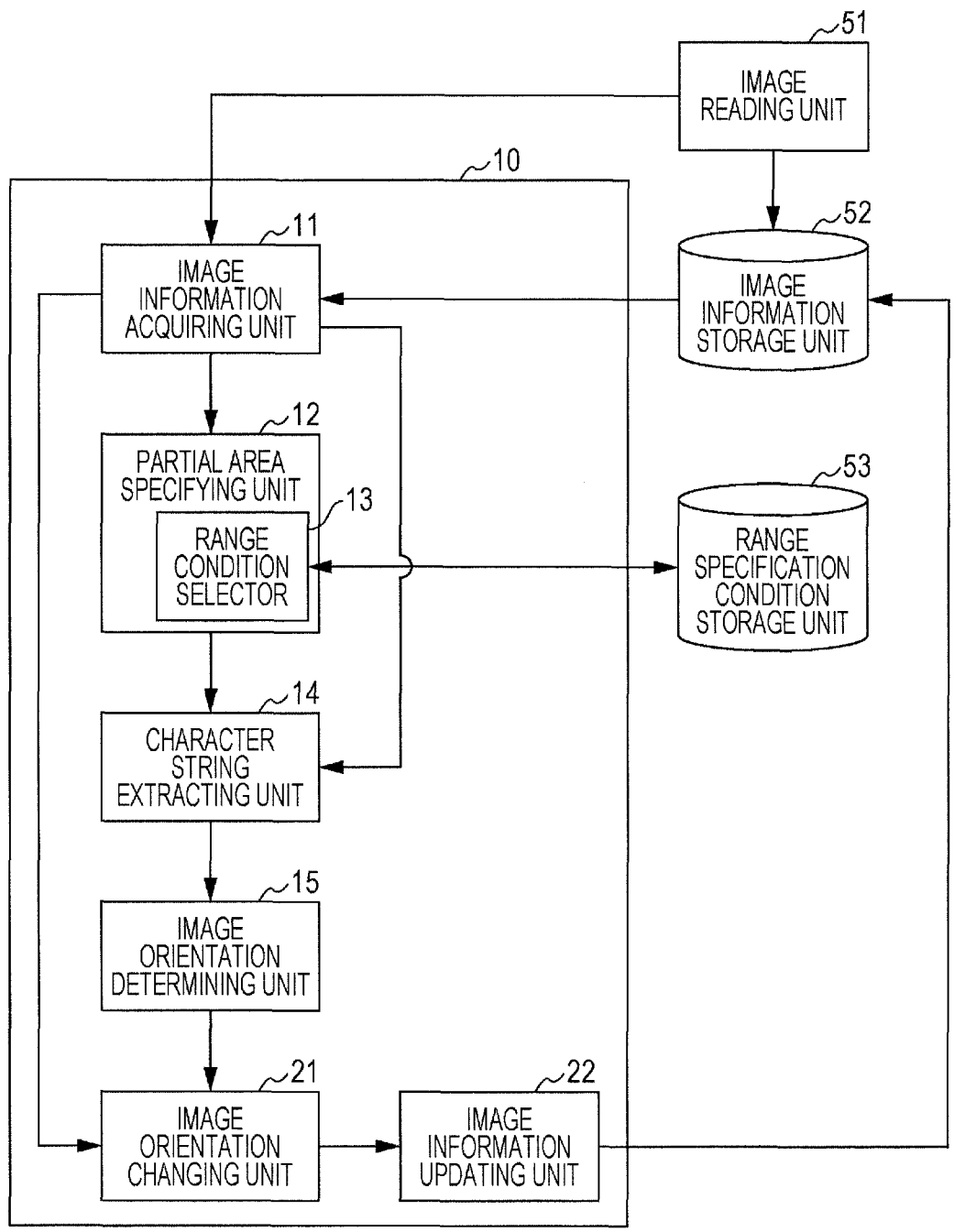

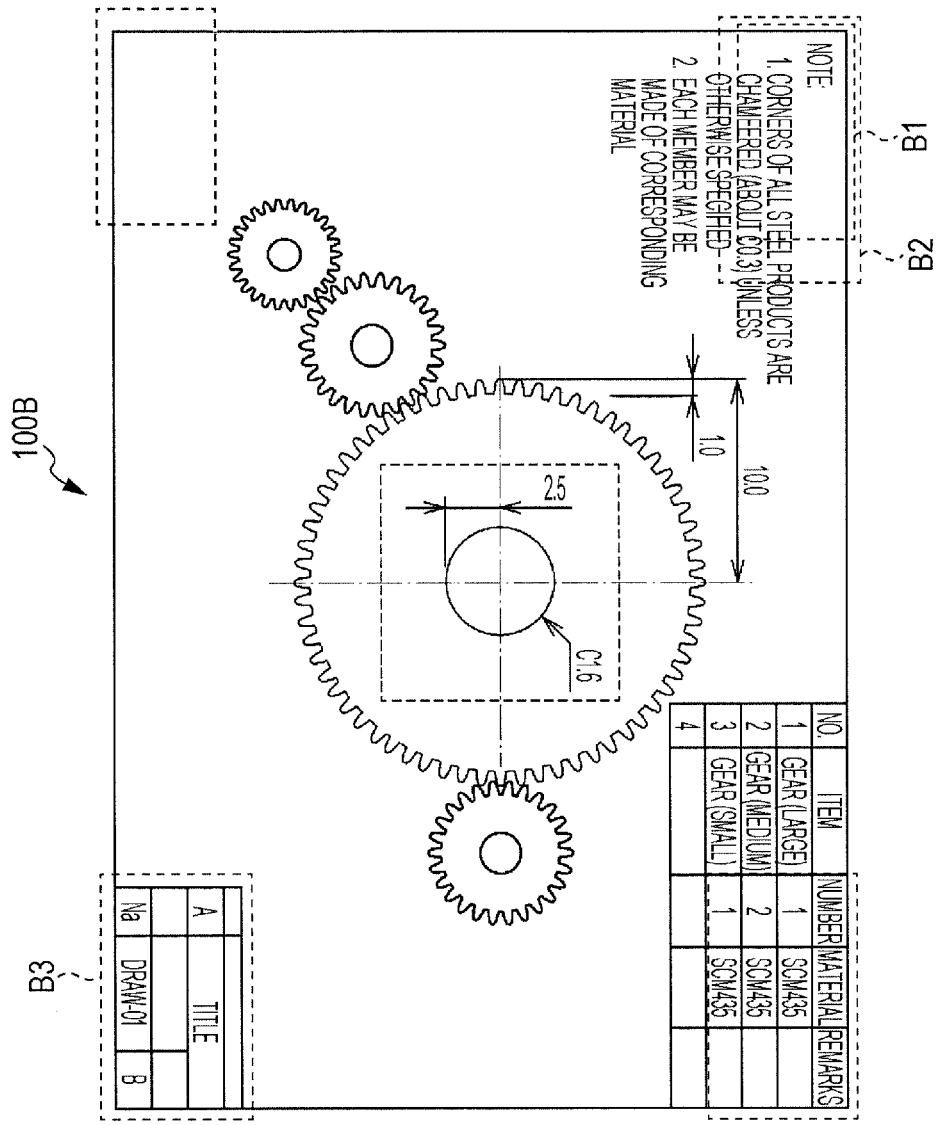

FIG. 3B

| CONDITION NO. | RANGE SPECIFICATION CONDITION | IMAGE SIZE INFORMATION | SELECTION ORDER |
|---|---|---|---|
| β1 | PARTIAL AREA HAVING 1/5 VERTICAL SIZE AND 1/5 HORIZONTAL SIZE OF ENTIRE IMAGE AT LOWER RIGHT CORNER OF IMAGE | A4 HORIZONTAL | 1 |
| β2 | PARTIAL AREA HAVING 1/5 VERTICAL SIZE AND 3/10 HORIZONTAL SIZE OF ENTIRE IMAGE AT LOWER RIGHT CORNER OF IMAGE | A4 HORIZONTAL | 2 |
| β3 | PARTIAL AREA HAVING 1/5 VERTICAL SIZE AND 1/5 HORIZONTAL SIZE OF ENTIRE IMAGE AT UPPER LEFT CORNER OF IMAGE | A4 HORIZONTAL | 3 |
| β4 | PARTIAL AREA HAVING 1/5 VERTICAL SIZE AND 3/10 HORIZONTAL SIZE OF ENTIRE IMAGE AT UPPER LEFT CORNER OF IMAGE | A4 HORIZONTAL | 4 |
| β5 | PARTIAL AREA HAVING 1/5 VERTICAL SIZE AND 1/5 HORIZONTAL SIZE OF ENTIRE IMAGE AT UPPER RIGHT CORNER OF IMAGE | A4 HORIZONTAL | 5 |
| β6 | ... AT UPPER RIGHT CORNER OF IMAGE | A4 HORIZONTAL | 6 |
| : | : | : | : |

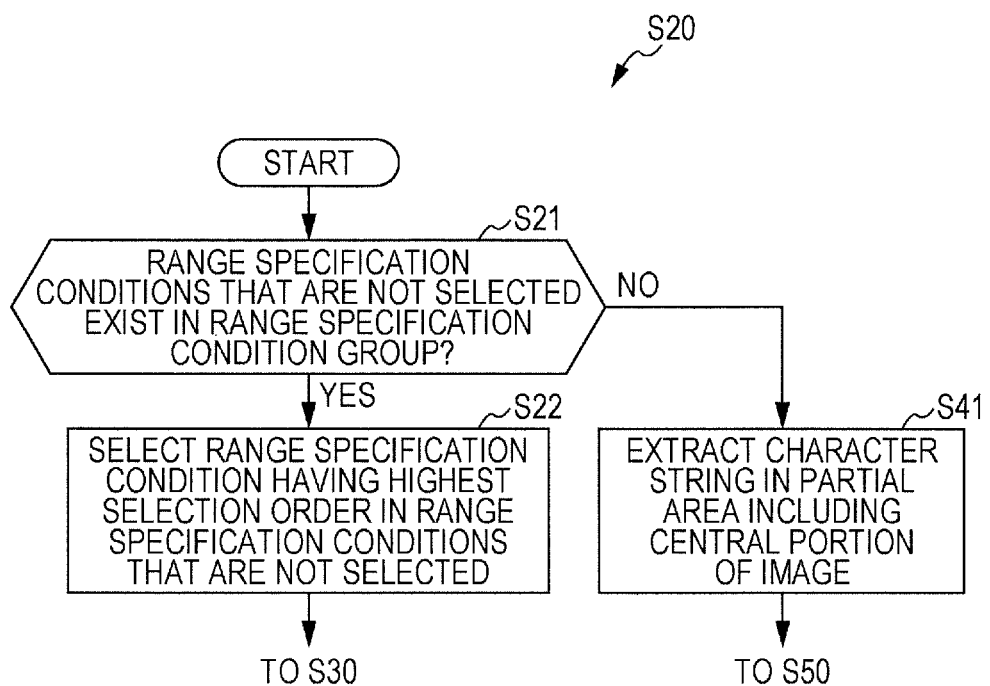

IMAGE PROCESSING APPARATUS, IMAGE PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-255806 filed Dec. 11, 2013.

BACKGROUND

Technical Field

The present invention relates to an image processing apparatus, an image processing method, and a non-transitory computer readable medium.

SUMMARY

According to an aspect of the invention, there is provided an image processing apparatus determining an orientation of an image according to acquired image information. The image processing apparatus includes an image information acquiring unit, a character string extracting unit, and an image orientation determining unit. The image information acquiring unit acquires image information. The character string extracting unit extracts a character string existing in a rectangular region surrounded by ruled lines or ruled lines and a periphery of the image in a partial area that is a part of the image and that meets a predetermined condition. The image orientation determining unit determines an orientation of the image according to a direction of the character string extracted by the character string extracting unit.

BRIEF DESCRIPTION OF THE DRAWINGS

Exemplary embodiments of the present invention will be described in detail based on the following figures, wherein:

FIG. 1 is a block diagram illustrating an example of major components in an image processing apparatus according to an exemplary embodiment of the present invention;

FIG. 2B illustrates another exemplary image represented by image information acquired by the image information acquiring unit;

FIG. 3B illustrates another exemplary area specification condition group composed of multiple predetermined area specification conditions;

FIG. 5 is a flowchart illustrating an example of selection of an area condition.

DETAILED DESCRIPTION

Figure 2A:
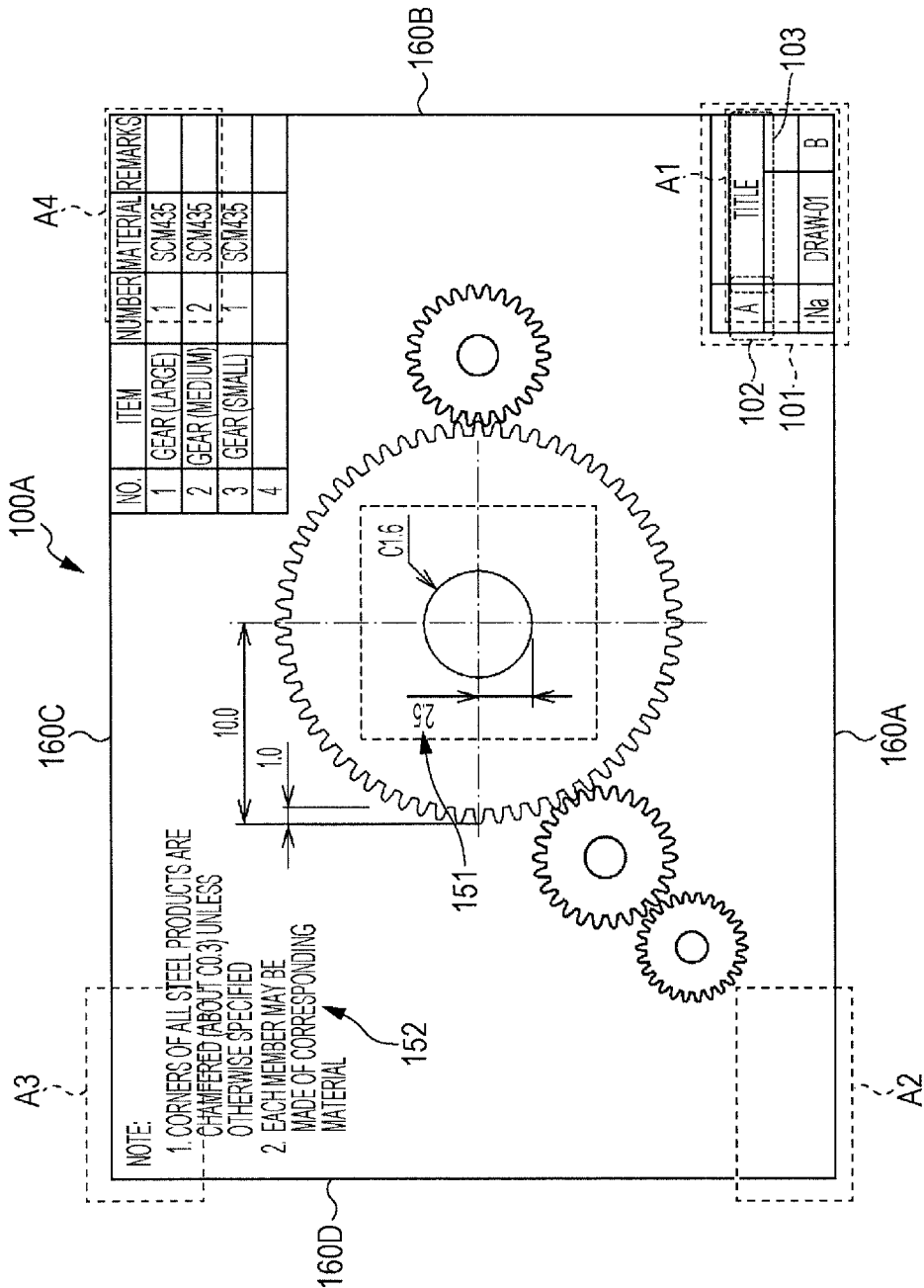
FIG. 2A illustrates an exemplary image represented by image information acquired by an image information acquiring unit.

An image processing apparatus according to an exemplary embodiment of the present invention will herein be described with reference to the attached drawings.

An image processing apparatus according to an exemplary embodiment of the present invention determines an orientation of an image according to acquired image information. The image processing apparatus includes an image information acquiring unit, a character string extracting unit, and an image orientation determining unit. The image information acquiring unit acquires image information. The character string extracting unit extracts a character string existing in a rectangular region surrounded by ruled lines or ruled lines and a periphery of the image in a partial area that is a part of the image and that meets a predetermined condition. The image orientation determining unit determines an orientation of the image according to a direction of the character string extracted by the character string extracting unit.

FIG. 1 is a block diagram illustrating an example of major components in an image processing apparatus according to an exemplary embodiment of the present invention. Referring to FIG. 1, an image processing apparatus 10 includes an image information acquiring unit 11, a character string extracting unit 14, and an image orientation determining unit 15.

The image processing apparatus 10 may arbitrarily include a partial area specifying unit 12, an image orientation changing unit 21, and an image information updating unit 22 illustrated in FIG. 1.

The image processing apparatus 10 uses the result of analysis in a partial area, which is in an image represented by image information that is acquired, in which a character string facing the direction coinciding with the orientation of the image is supposed to exist, and which is a portion that meets a predetermined condition, as a material for determining the orientation of the image. This will be described in detail below.

The image processing apparatus 10 may determine the partial area to be unique or may specify the partial area on the basis of one area specification condition selected from an area specification condition group composed of multiple predetermined area specification conditions. When the image processing apparatus 10 specifies the partial area on the basis of one area specification condition selected from the area specification condition group composed of the multiple predetermined area specification conditions, the image processing apparatus 10 may include the partial area specifying unit 12 illustrated in FIG. 1.

Accordingly, the image processing apparatus according to the exemplary embodiment of the present invention, which determines an orientation of an image according to acquired image information, may include an image information acquiring unit that acquires image information; a partial area specifying unit that specifies a partial area, which is a part of the image, according to an area specification condition selected from an area specification condition group composed of multiple predetermined area specification conditions; a character string extracting unit that extracts a character string existing in a rectangular region surrounded by ruled lines or ruled lines and a periphery of the image in the partial area in the image, specified by the partial area specifying unit; and an image orientation determining unit that determines an orientation of the image according to a direction of the character string extracted by the character string extracting unit.

The functions of the components in the image processing apparatus 10 may realized by a computer which includes a controller, such as a central processing unit (CPU), a memory, an input-output unit that transmits and receives data to and from an external device, and so on and which reads a program stored in a computer readable information storage medium to execute the program.

The program may be supplied to the image processing apparatus 10, which is a computer, via the information storage medium, such as an optical disk, a magnetic disk, a magnetic tape, a magneto-optical disk, or a flash memory, or may be supplied to the image processing apparatus 10 via a data communication network, such as the Internet.

The major components in the image processing apparatus according to the exemplary embodiment of the present invention will now be individually described.

[Image Information Acquiring Unit]

The image information acquiring unit 11 acquires image information representing an image the orientation of which is to be determined. The image information includes information concerning bit map data representing the image, the size of the image (the size, such as A4 or B4, of the image that is output), the creator of the image, the date when the image is created, and so on.

The image information acquiring unit 11 may acquire the image information from an image information storage unit 52, such as a hard disk, an external device, or a memory, which stores the image information. Alternatively, the image information acquiring unit 11 may directly acquire the image information from an image reading unit 51, such as a scanner or a digital camera, which is provided with an image information generator.

Various images of a drawing of an industrial product or the like, a business document, and so on are represented by the image information. FIG. 2A illustrates an example of the image represented by the image information acquired by the image information acquiring unit 11. FIG. 2B illustrates another example of the image represented by the image information acquired by the image information acquiring unit 11.

Although both of the images illustrated in FIG. 2A and FIG. 2B represent drawings of an industrial product, the image illustrated in FIG. 2A is different from the image illustrated in FIG. 2B in that the image illustrated in FIG. 2B is upside down with respect to the image illustrated in FIG. 2A. The orientation of the image represented by the image information acquired by the image information acquiring unit 11 is varied, as described above.

[Partial Area Specifying Unit]

The partial area specifying unit 12 may be provided when the image processing apparatus 10 specifies a partial area on the basis of one area specification condition selected from the area specification condition group composed of the multiple predetermined area specification conditions, as described above.

The partial area specifying unit 12 specifies a partial area, which is a part of the image represented by the image information acquired by the image information acquiring unit 11, on the basis of one area specification condition selected from the area specification condition group composed of the multiple predetermined area specification conditions.

The area specification condition group composed of the multiple area specification conditions may be stored in an area specification condition storage unit 53, such as a hard disk, an external device, or a memory, which stores the area specification condition group. An area condition selector 13 in the partial area specifying unit 12 may select one area specification condition from the area specification condition group stored in the area specification condition storage unit 53.

An image processing apparatus that determines the orientation of an image in related art determines the orientation of the image on the basis of the result of table recognition or character recognition for the entire image while the image processing apparatus according to the exemplary embodiment of the present invention determines the orientation of an image on the basis of the result of analysis of the partial area, which is a part of the image set in advance in the entire image.

The partial area, which is a part of the image set in advance, is used as the partial area in which a character string described in the direction coinciding with the orientation of the image is supposed to exist, to improve the accuracy of the determination of the orientation of the image.

Since the amount of analysis is reduced in the image processing apparatus according to the exemplary embodiment of the present invention, compared with the image processing apparatus determining the orientation of an image in the related art, the image processing apparatus according to the exemplary embodiment of the present invention is capable of reducing the processing time to determine the orientation of the image.

For example, when the direction of the character string existing in the image is analyzed to determine the orientation of the image, the image processing apparatus determining the orientation of an image in the related art is often not capable of accurately determining the orientation of the image including the character strings varied in direction.

The character string in the specification includes one or more characters that are arranged and is composed of characters including alphanumeric characters, Kana characters, and various symbols.

The direction of the character string in the specification means the direction from the bottom to the top of the characters composing the character string. For example, an image 100A illustrated FIG. 2A also includes both character strings that are vertically described and character strings that are horizontally described (for example, a character string 151 facing left and a character string 152 facing upward in FIG. 2A). Accordingly, when the direction of the character string existing in the image is analyzed to determine the orientation of the image, the orientation of the image is often not accurately determined.

Also when attention is focused on the character strings in drawings included in the image to determine the orientation of the image, the orientation of the image is often not accurately determined in the case of the drawings including characters that are varied in direction.

In contrast, the image processing apparatus 10 according to the exemplary embodiment of the present invention analyzes the partial area, which is a part of the image set in advance, to determine the orientation of the image that is displayed. In the determination of the orientation of the image that is displayed, the partial area, which is a part of the image set in advance as the material for the determination, is used as the partial area in which a character string described in the direction coinciding with the orientation of the image is supposed to exist to improve the accuracy of the determination of the orientation of the image.

Specifically, for example, when the image the orientation of which is to be determined represents a drawing of an industrial product or the like, character strings concerning a "title of drawing" (for example, denoted by reference numeral 101 in FIG. 2A) indicating the date when the drawing is created, the creator of the drawing, the title of the drawing, and so on are commonly described in rectangular regions (for example, denoted by reference numerals 102 and 103 in FIG. 2A) surrounded and portioned by ruled lines or ruled lines and the periphery (denoted by reference numerals 160A to 160D in FIG. 2A) of the image at the lower right corner of the image. The character strings concerning the "title of drawing" described in such a drawing are commonly described in the direction coinciding with the orientation of the drawing.

Accordingly, in the determination of the orientation of the image representing the drawing of the industrial product or the like, the accuracy of the determination of the orientation of the image is improved in the image processing apparatus that selects only the partial area in which the character strings concerning the "title of drawing" described in the drawing are supposed to be exist as the area to be analyzed to determine the orientation of the image, compared with the image processing apparatus that analyzes the entire image represented by the image information to determine the orientation of the image.

In another exemplary image, for example, in the case of a business document, character strings concerning a "document approval field" indicating the creator of the document, the authorizer of the document, and the confirmation signature of the boss of the creator, and so on are commonly described in the rectangular regions surrounded and portioned by ruled lines or ruled lines and the periphery of the image at the upper right corner of the document. The character strings concerning the "document approval field" described in such a document are commonly described in the direction coinciding with the orientation of the drawing.

Accordingly, in the determination of the orientation of the image representing the business document, the accuracy of the determination of the orientation of the image is improved in the image processing apparatus that selects only the partial area in which the character strings concerning the "document approval field" described in the document are supposed to be exist as the area to be analyzed to determine the orientation of the image, compared with the image processing apparatus that analyzes the entire image represented by the image information to determine the orientation of the image.

The image processing apparatus according to the exemplary embodiment of the present invention analyzes the partial area, in which the character strings which are described in the direction coinciding with the orientation of the image and which exist in the rectangular region surrounded and portioned by the ruled lines or the ruled lines and the periphery of the image are supposed to exist and which is a part of the image, in the determination of the orientation of the image, to further improve the accuracy of the determination of the orientation of the image.

In addition, since the analysis of only the partial area, which is a part of the image, to determine the orientation of the image means the determination of the orientation of the image with a smaller amount of analysis, the determination speed is also increased.

Figure 3A:
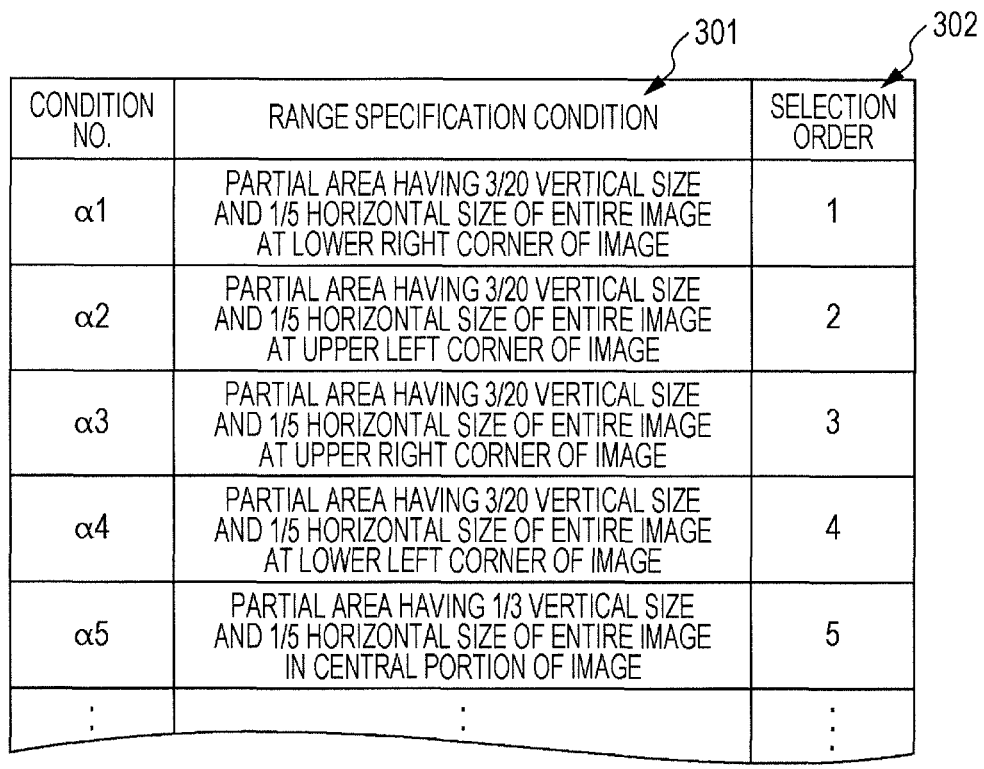
FIG. 3A illustrates an exemplary area specification condition group composed of multiple predetermined area specification conditions.

FIG. 3A illustrates an example of the area specification condition group composed of the multiple predetermined area specification conditions. Referring to FIG. 3A, a "selection order" 302 representing the order of the selection by the area condition selector 13 is set in advance for each "area specification condition 301" composing an area specification condition group 300A.

As described above, the area specification condition group composed of the multiple predetermined area specification conditions may include the area specification condition that specifies the partial area including an area adjoining to one corner selected from the four corners of the image in consideration of the fact that the character strings described in the direction coinciding with the orientation of the image commonly exist at the four corners of the image (for example, when the image represents a drawing of an industrial product or the like, the character strings concerning the "title of drawing" indicating the title of the drawing and the like are commonly described at the lower right corner of the drawing).

The partial area including an area adjoining to one corner selected from the four corners of the image is, for example, each of partial areas surrounded by broken lines A1 to A4 in the image 100A illustrated in FIG. 2A. The area specification condition that specifies the partial area including an area adjoining to one corner selected from the four corners of the image is the area specification condition defined by each of conditions Nos. $\alpha 1$ to $\alpha 4$ in FIG. 3A. The partial area may include or may not include one corner itself selected from the four corners of the image.

The partial area which is specified by the partial area specifying unit 12 and which is a part of the image will now be specifically described. For example, when the image 100A illustrated in FIG. 2A is acquired as the image represented by the image information by the image information acquiring unit 11, the partial area specifying unit 12 selects the area specification condition of the "condition No. $\alpha 1$" having the highest "selection order" from the area specification condition group to specify the partial area, which is a part of the image.

Since the area specification condition of the "condition No. $\alpha 1$" is "Partial area having $3/20$ vertical size and $1/5$ horizontal size of entire image at lower right corner of image", the partial area specifying unit 12 specifies the portion surrounded by the broken line A1 in FIG. 2A.

The area specification condition group composed of the multiple predetermined area specification conditions may at least include a first area specification condition that specifies a first partial area adjoining to a first corner among the four corners of the image, a second area specification condition that specifies a second partial area adjoining to a second corner among the four corners of the image, a third area specification condition that specifies a third partial area adjoining to a third corner among the four corners of the image, and a fourth area specification condition that specifies a fourth partial area adjoining to a fourth corner among the four corners of the image. The first to fourth area specification conditions specifically correspond to the area specification conditions of the conditions Nos. $\alpha 1$ to $\alpha 4$ in FIG. 3A.

As described above, the inclusion of the area specification condition that specifies the partial area adjoining to one corner selected from the four corners of the image and that corresponds to each corner in the area specification condition group 300A increases the probability of the area specification condition group 300A to include the area specification condition specifying the partial area in which the character strings that are described in the direction coinciding with the orientation of the image and that exist in the rectangular region surrounded by ruled lines or ruled lines and the periphery of the image are supposed to exist.

Accordingly, the image processing apparatus 10 specifies the partial areas specified on the basis of the first to fourth area specification conditions described above in a predetermined order until any character string existing in the rectangular regions is extracted to further improve the accuracy of the determination of the orientation of the image.

The partial area specifying unit 12 may select one area specification condition from the area specification condition group on the basis of the size of the image represented by the image information acquired by the image information acquiring unit 11 to specify a partial area, which is a part of the image.

A rated size or rated sizes are often determined depending on the kind of the document. For example, the rated sizes of the drawings of industrial products in Japan are A4 size and B4 size, the rated size of business documents in Japan is A4 size, and the rated size of business documents in USA is letter size.

FIG. 3B illustrates another example of the area specification condition group composed of the multiple predetermined area specification conditions. Referring to FIG. 3B, image size information 303 is set in advance for each area specification condition 301 composing an area specification condition group 300B, in addition to the "selection order" 302 representing the order of the selection by the area condition selector 13.

For example, when the size of the image represented by the image information acquired by the image information acquiring unit 11 is A4 horizontal size, the partial area specifying unit 12 (the area condition selector 13) selects the area specification condition 301 having the highest selection order from the area specification conditions for which A4 horizontal size is set in the image size information 303 to specify a partial area, which is a part of the image represented by the image information acquired by the image information acquiring unit 11.

Specifically, when an image of A4 horizontal size is acquired by the image information acquiring unit 11 as the image represented by the image information, the partial area specifying unit 12 selects the area specification condition of the "condition No. β1" having the highest selection order, among the area specification conditions for which A4 horizontal size is set in the "image size information", from the area specification condition group to specify a partial area, which is a part of the image.

Since the area specification condition of the "condition No. β1" is "Partial area having ⅕ vertical size and ⅕ horizontal size of entire image at lower right corner of image", the partial area specifying unit 12 specifies the "partial area having ⅕ vertical size and ⅕ horizontal size of entire image at lower right corner of image" in the image that is acquired.

When the partial area specifying unit 12 selects one area specification condition from the area specification condition group on the basis of the size information about the image represented by the image information acquired by the image information acquiring unit 11 to specify a partial area, which is a part of the image, the partial area may have a similar shape of the size of the image or may be a partial area having long sides longer than those of the similar shape of the size of the image.

[Character String Extracting Unit]

The character string extracting unit 14 extracts a character string existing in a rectangular region surrounded by ruled lines or ruled lines and the periphery of the image, in a partial area that is a part of the image represented by the image information acquired by the image information acquiring unit 11 and that meets a predetermined condition.

For example, if there is only one partial area, the character string extracting unit 14 extracts the character string existing in the rectangular region surrounded by ruled lines or ruled lines and the periphery of the image in the partial area.

Specifically, the character string extracting unit 14 first extracts the rectangular region surrounded by ruled lines or ruled lines and the periphery of the image in the partial area that is a part of the image represented by the image information acquired by the image information acquiring unit 11 and that meets a predetermined condition and then extracts the character string in the extracted rectangular region.

When the partial area is specified on the basis of one area specification condition selected from the area specification condition group composed of the multiple predetermined area specification conditions by the partial area specifying unit 12, the character string extracting unit 14 extracts the character string existing in the rectangular region surrounded by ruled lines or ruled lines and the periphery of the image, in the partial area in the image specified by the partial area specifying unit 12.

Specifically, the character string extracting unit 14 may first extract the rectangular region surrounded by ruled lines or ruled lines and the periphery of the image in the partial area in the image specified by the partial area specifying unit 12 and may then extract the character string in the extracted rectangular region.

The character string extracting unit 14 may first extract the character string in the partial area in the image specified by the partial area specifying unit 12, may determine whether the character string exists in the rectangular region surrounded by ruled lines or ruled lines and the periphery of the image, and may extract the character string as the character string existing in the rectangular region surrounded by ruled lines or ruled lines and the periphery of the image if the character string extracting unit 14 determines that the character string exists in the rectangular region surrounded and portioned by ruled lines or ruled lines and the periphery of the image.

The rectangular region may a rectangular region surrounded and portioned by two ruled lines that horizontally extend and two ruled lines that vertically extend in the image represented by the image information or may be a rectangular region surrounded by part of the ruled lines surrounding the rectangular region and the periphery (outer frame) of the image.

The rectangular region surrounded and portioned by two ruled lines that horizontally extend and two ruled lines that vertically extend is exemplified by the rectangular region 102 in the image illustrated in FIG. 2A. The rectangular region surrounded by ruled lines and the periphery of the image is exemplified by the rectangular region 103 in the image illustrated in FIG. 2A.

The extraction of the rectangular region is realized by a technology in the related art and, for example, may be realized by extraction of the ruled lines surrounding the rectangular region.

When the rectangular region is a rectangular region surrounded and portioned by two ruled lines that horizontally extend and two ruled lines that vertically extend in the image represented by the image information, the character string extracting unit 14 may extract the character string surrounded by the four corners formed by the four ruled lines partitioning the rectangular region in the partial area in the image specified by the partial area specifying unit 12.

The character string extracting unit 14 may extract the character string using, for example, a character recognition technology in the related art, such as optical character recognition (OCR).

The character string extracting unit 14 may extract the character string existing in the rectangular region surrounded and portioned by ruled lines or ruled lines and the periphery of the image in the partial area in the image specified by the partial area specifying unit 12 from four directions of the image: horizontal directions (rightward from the left and leftward from the right) and vertical directions (downward from the top and upward from the bottom) of the image.

[Image Orientation Determining Unit]

The image orientation determining unit 15 determines the orientation of the image represented by the image information acquired by the image information acquiring unit 11 on the basis of the direction of the character string extracted by the character string extracting unit 14. Specifically, the image orientation determining unit 15 determines which direction the character string extracted by the character string extracting unit 14 faces to determine whether the orientation of the image represented by the image information acquired by the image information acquiring unit 11 coincides with the direction of the character string.

If multiple character strings are extracted by the character string extracting unit 14 and the multiple character strings face different directions, for example, the image orientation determining unit 15 may determine the orientation of the image represented by the image information acquired by the image information acquiring unit 11 on the basis of the direction of the character string having the largest character size (font size), among the multiple character strings which are extracted by the character string extracting unit 14 and which face different directions.

The above determination is performed because, since the direction of the character string having the largest character size (font size) often coincides with the orientation of the image, the determination of the orientation of the image represented by the image information acquired by the image information acquiring unit 11 on the basis of the direction of the character string having the largest character size (font size) increases the accuracy of the determination of the orientation of the image.

If multiple character strings are extracted by the character string extracting unit 14 and the multiple character strings face different directions, for example, the image orientation determining unit 15 may determine the orientation of the image represented by the image information acquired by the image information acquiring unit 11 on the basis of the direction of the character string existing in the largest rectangular region, among the multiple character strings facing different directions, extracted by the character string extracting unit 14.

The above determination is performed because, since the direction of the character string existing in the larger rectangular region often coincides with the orientation of the image, the determination of the orientation of the image represented by the image information acquired by the image information acquiring unit 11 on the basis of the direction of the character string surrounded by the largest rectangular region increases the accuracy of the determination of the orientation of the image.

If multiple character strings are extracted by the character string extracting unit 14 and the multiple character strings face different directions, for example, the image orientation determining unit 15 may determine the orientation of the image represented by the image information acquired by the image information acquiring unit 11 on the basis of the direction of the character string including the largest number of characters, among the multiple character strings facing different directions, extracted by the character string extracting unit 14.

The above determination is performed because, since the direction of the character string including the larger number of characters often coincides with the orientation of the image, the determination of the orientation of the image represented by the image information acquired by the image information acquiring unit 11 on the basis of the direction of the character string including the largest number of characters increases the accuracy of the determination of the orientation of the image.

If a first character string facing one direction and a second character string facing a direction different from the one direction are extracted by the character string extracting unit 14, for example, the image orientation determining unit 15 may determine the orientation of the image represented by the image information acquired by the image information acquiring unit 11 on the basis of the respective directions of the first character string and the second character string.

If a first character string facing one direction and a second character string facing another direction intersecting with the one direction are extracted by the character string extracting unit 14, the image orientation determining unit 15 may determine the orientation of the image represented by the image information acquired by the image information acquiring unit 11 on the basis of a direction between the respective directions of the first character string and the second character string or on the basis of a composite direction of the respective directions of the first character string and the second character string.

More specifically, if the character strings facing two directions are extracted by the character string extracting unit 14 and the directions are the up direction and the left direction, the image orientation determining unit 15 may determine that the image represented by the image information acquired by the image information acquiring unit 11 faces the upper left because the direction between the two directions is the upper left direction.

If a first character string facing one direction and a second character string facing another direction are extracted by the character string extracting unit 14, the image orientation determining unit 15 may determine the orientation of the image on the basis of a predetermined condition depending on the direction of the first character string and the direction of the second character string. For example, (1) the image orientation determining unit 15 determines that the image faces upward when the direction of the first character string and the direction of the second character string are the up direction and the left direction, respectively, (2) the image orientation determining unit 15 determines that the image faces rightward when the direction of the first character string and the direction of the second character string are the right direction and the up direction, respectively, (3) the image orientation determining unit 15 determines that the image faces downward when the direction of the first character string and the direction of the second character string are the down direction and the right direction, respectively, and (4) the image orientation determining unit 15 determines that the image faces leftward when the direction of the first character string and the direction of the second character string are the left direction and the down direction, respectively.

If a first character string facing one direction and a second character string facing a direction different from the one direction are extracted by the character string extracting unit 14, for example, the image orientation determining unit 15 may determine the orientation of the image represented by the image information acquired by the image information acquiring unit 11 on the basis of the respective directions of the first character string and the second character string and the number of characters composing the first character string and the number of characters composing the second character string.

Specifically, if the number of characters composing the first character string is larger than the number of characters composing the second character string even when the one direction of the first character string extracted by the character string extracting unit 14 does not intersect with the other direction of the second character string extracted by the character string extracting unit 14, the image orientation determining unit 15 may determine that the image faces the one direction of the first character string.

Similarly, if a first character string facing one direction and a second character string facing a direction different from the one direction are extracted by the character string extracting unit 14, for example, the image orientation determining unit 15 may determine the orientation of the image represented by the image information acquired by the image information acquiring unit 11 on the basis of the respective directions of the first character string and the second character string and the sizes (font sizes) of the characters composing the first character string and the second character string.

If a first character string facing one direction and a second character string facing a direction different from the one direction are extracted by the character string extracting unit 14, for example, the image orientation determining unit 15 may determine the orientation of the image represented by the image information acquired by the image information acquiring unit 11 on the basis of the respective directions of the first character string and the second character string and the direction of the character string existing in the largest rectangular region, in the first character string and the second character string.

[Image Orientation Changing Unit]

The image processing apparatus 10 may arbitrarily include the image orientation changing unit 21 described below.

The image orientation changing unit 21 changes the orientation of the image determined by the image orientation determining unit 15. For example, the image orientation changing unit 21 may change the orientation of the image determined by the image orientation determining unit 15 so that the character string extracted by the character string extracting unit 14 faces the correct up and down directions.

[Image Information Updating Unit]

The image processing apparatus 10 may arbitrarily include the image information updating unit 22 described below.

The image information updating unit 22 updates the image information concerning the image with the orientation of the image changed by the image orientation changing unit 21. The image information updated by the image information updating unit 22 may be stored in the image information storage unit 52, such as a hard disk, an external device, or a memory, which stores the image information.

The major components in the image processing apparatus according to the exemplary embodiment of the present invention are individually described above. The content of a process performed by the image processing apparatus 10 according to the exemplary embodiment of the present invention will now be described in detail.

A non-transitory computer readable medium storing a program, which is executed by the image processing apparatus 10 according to the exemplary embodiment of the present invention, causes a computer to execute a process including acquiring image information; extracting a character string existing in a rectangular region surrounded by ruled lines or ruled lines and a periphery of an image represented by the acquired image information in a partial area that is a part of the image and that meets a predetermined condition; and determining an orientation of the image according to a direction of the extracted character string.

Figure 4:
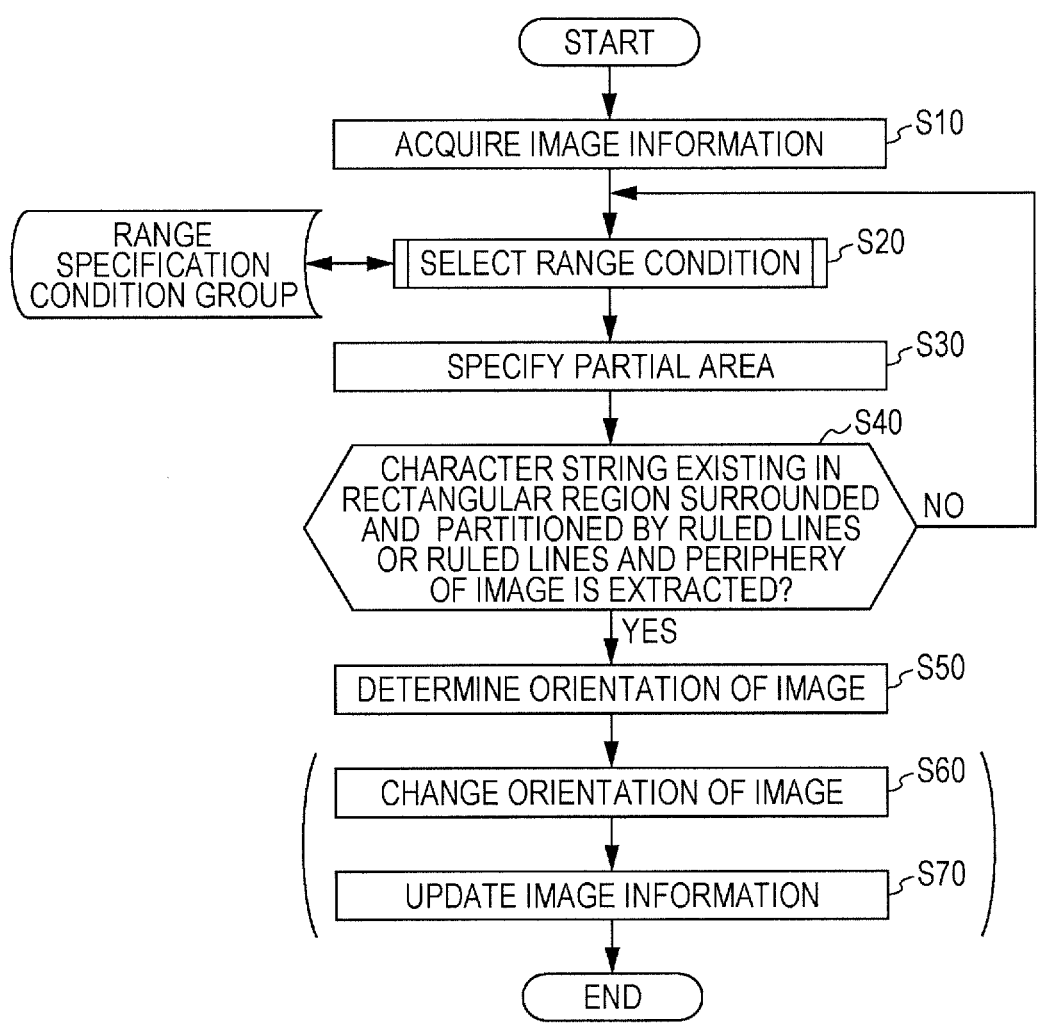
FIG. 4 is flowchart illustrating an exemplary process performed by the image processing apparatus according to an exemplary embodiment of the present invention.

FIG. 4 is flowchart illustrating an exemplary process performed by the image processing apparatus 10 according to an exemplary embodiment of the present invention.

Referring to FIG. 4, in Step S10, the image processing apparatus 10 according to the exemplary embodiment of the present invention acquires the image information including information concerning bit map data representing an image, the size of the image (for example, the size, such as A4 or B4, of the image that is output), the creator of the image, and the date when the image is created.

It is assumed in the following description for convenience that the image represented by the image information acquired by the image processing apparatus 10 in Step S10 is an image 100B illustrated in FIG. 2B.

Although the image represented by the image information acquired in Step S10 represents the drawing of an industrial product illustrated in FIG. 2B, the direction of the drawing that is displayed is upside down with respect to the correct direction of the drawing. It is also assumed in the image information acquired in Step S10 that the size (the size when the image is output) of the drawing of an industrial product illustrated in FIG. 2B is A4 horizontal size.

When a partial area is specified on the basis of one area specification condition selected from the area specification condition group composed of the multiple predetermined area specification conditions, in Step S20, the image processing apparatus 10 selects one area specification condition from the area specification condition group composed of the multiple predetermined area specification conditions in order to specify a partial area, which is a part of the image represented by the image information acquired in Step S10.

Step S20 will now be described in detail with reference to FIG. 5. FIG. 5 is a flowchart illustrating an example of the selection of the area condition.

The image processing apparatus 10 selects one area specification condition having the highest selection order (the highest priority order of selection) from the area specification conditions that are not selected in Step S20 after Step S10. Referring to FIG. 5, in Step S21, the image processing apparatus 10 determines whether the area specification conditions that are not selected exist in the area specification condition group. If the image processing apparatus 10 determines that the area specification conditions that are not selected exist in the area specification condition group (YES in Step S21), in Step S22, the image processing apparatus 10 selects the area specification condition having the highest selection order from the area specification conditions that are not selected.

Specifically, when the area specification condition group composed of the multiple predetermined area specification conditions is the area specification condition group 300A illustrated in FIG. 3A, the image processing apparatus 10 selects the area specification condition of the "condition No. α1" as the area specification condition having the highest selection order (the highest priority order of selection) in Step S20 immediately after Step S10.

Alternatively, as described above, at least part of the area specification conditions composing the area specification condition group may be held in association with the image size information, as illustrated in FIG. 3B. When the area specification condition group composed of the multiple predetermined area specification conditions is the area specification condition group 300B illustrated in FIG. 3B, the image processing apparatus 10 selects the area specification condition of the "condition No. β1" having the highest "selection order", among the area specification conditions the "image size information" about which is set to be A4 size horizontal, in Step S20 immediately after Step S10.

If the image processing apparatus 10 determines that the area specification conditions that are not selected do not exist in the area specification condition group (NO in Step S21), in Step S41, the image processing apparatus 10 extracts a character string in a partial area including a central portion of the image represented by the image information acquired in Step S10. The character string extracted in Step S41 is used in determination of the orientation of the image in Step S50 described below.

It is assumed in the following description for convenience that the area specification condition group is composed of the multiple area specification conditions 301 illustrated in FIG. 3B and that the area specification condition of the "condition No. β1" having the highest "selection order" is selected, among the area specification conditions the "image sizes" of which are A4 size horizontal, in Step S20 immediately after Step S10.

Referring back to FIG. 4, in Step S30, the image processing apparatus 10 specifies a partial area, which is a part of the image represented by the image information acquired in Step S10, on the basis of the area specification condition selected in Step S20.

Specifically, since the area specification condition of the "condition No. β1" selected as the area specification condition in Step S20 is "Partial area having ⅕ vertical size and ⅕ horizontal size of entire image at lower right corner of image", the image processing apparatus 10 specifies a portion surrounded by a broken line B1 in FIG. 2B, which corresponds to the "Partial area having ⅕ vertical size and ⅕ horizontal size of entire image at lower right corner of image", in the acquired image in Step S30.

In Step S40, the image processing apparatus 10 extracts a character string existing in a rectangular region surrounded and portioned by ruled lines or ruled lines and the periphery of the image in the partial area which is specified in Step S30 and which is a part of the image represented by the image information.

Step S40 in which a character string existing in a rectangular region surrounded and portioned by ruled lines or ruled lines and the periphery of the image is extracted may be a step to extract a rectangular region surrounded by ruled lines or ruled lines and the periphery of the image in the partial area which is specified in Step S30 and which is a part of the image represented by the image information and, then, extract a character string in the extracted rectangular region.

Alternatively, Step S40 in which a character string existing in a rectangular region surrounded and portioned by ruled lines or ruled lines and the periphery of the image is extracted may be a step to extract a character string in a partial area in the image specified by the partial area specifying unit 12, determine whether the character string exists in a rectangular region surrounded and portioned by the ruled lines or ruled lines and the periphery of the image, and extract the character string as a character string existing in a rectangular region surrounded by the ruled lines or ruled lines and the periphery of the image if it is determined that the character string exists in a rectangular region surrounded and portioned by the ruled lines or ruled lines and the periphery of the image.

If the image processing apparatus 10 extracts a character string surrounded by the rectangular region in the partial area (YES in Step S40), in Step S50, the image processing apparatus 10 determines the orientation of the image on the basis of the direction of the extracted character string.

If the image processing apparatus 10 does not extract a character string existing in a rectangular region surrounded and portioned by ruled lines or ruled lines and the periphery of the image in the partial area which is specified in Step S30 and which is a part of the image represented by the image information (NO in Step S40), the image processing apparatus 10 selects another area specification condition from the area specification condition group and specifies another partial area, which is a part of the image, on the basis of the other area specification condition.

In this case, the image processing apparatus 10 selects the area specification condition having the highest selection order (the highest priority order of selection), among the area specification conditions that are not selected in Step 20, as the other area specification condition.

More specifically, in this example, the image processing apparatus 10 specifies the portion surrounded by the broken line B1, which corresponds to the "Partial area having ⅕ vertical size and ⅕ horizontal size of entire image at lower right corner of image", in the image 100B illustrated in FIG. 2B in Step S30.

Since no rectangular region surrounded by ruled lines or ruled lines and the periphery of the image exists in the portion surrounded by the broken line B1, the image processing apparatus 10 does not extract a character string existing in a rectangular region surrounded by the ruled lines or ruled lines and the periphery of the image.

Accordingly, the process goes back to Step S20. In Step S20, the image processing apparatus 10 selects the area specification condition of the "condition No. β2" having the highest selection order (the highest priority order of selection), among the area specification conditions excluding the area specification condition of the "condition No. β1", from the area specification condition group.

In Step S30, the image processing apparatus 10 specifies a portion surrounded by a broken line B2, which corresponds to the "Partial area having ⅕ vertical size and 3/10 horizontal size of entire image at lower right corner of image", in the image 100B illustrated in FIG. 2B on the basis of the area specification condition of the "condition No. β2" selected in Step S20.

The portion surrounded by the broken line B2, which is newly specified and which corresponds to the "Partial area having ⅕ vertical size and 3/10 horizontal size of entire image at lower right corner of image", includes the portion surrounded by the broken line B1 and results from only horizontal extension of the portion surrounded by the broken line B1. The rectangular region often appears by gradually extending the partial area where a character string existing in a rectangular region surrounded by ruled lines or ruled lines and the periphery of the image is extracted with the partial area specified on the basis of the previous area specification condition included in the above manner.

This is because the character string facing the direction coinciding with the orientation the image 100B, which is normally described in a larger character size, often exists in the displayed image and the rectangular region surrounding the character string is often increased in size in proportion to the character size.

Accordingly, if the image processing apparatus 10 does not extract a character string existing in a rectangular region surrounded and portioned by ruled lines or ruled lines and the periphery of the image in the partial area which is specified in Step S30 and which is a part of the image represented by the image information (NO in Step S40), in Step S20, the image processing apparatus 10 may select another area specification condition that includes the partial area and that specifies an area larger than the partial area from the area specification condition group and may specify another partial area, which is a part of the image, on the basis of the other area specification condition.

However, since no rectangular region surrounded by ruled lines or ruled lines and the periphery of the image exists also in the portion surrounded by the broken line B2 in this example, the image processing apparatus 10 does not extract a character string existing in a rectangular region surrounded by the ruled lines or ruled lines and the periphery of the image.

Accordingly, the process goes back to Step S20 again. In Step S20, the image processing apparatus 10 selects the area specification condition of the "condition No. β3" having the highest selection order (the highest priority order of selection), among the area specification conditions excluding the area specification condition of the "condition No. β1" and the area specification condition of the "condition No. β2", from the area specification condition group.

In Step S30, the image processing apparatus 10 specifies a portion surrounded by a broken line B3, which corresponds to the "Partial area having ⅕ vertical size and ⅕ horizontal size of entire image at upper left corner of image", in the image illustrated in FIG. 2B on the basis of the area specification condition of the "condition No. β3" selected in Step S20.

Two character strings "TITLE" and "DRAW-01" existing in rectangular regions surrounded by ruled lines (the respective character strings are displayed upside down in the image illustrated in FIG. 2B) and a character string "B" existing in a rectangular region surrounded and portioned by ruled lines and the periphery of the image (the character string is displayed upside down in the image illustrated in FIG. 2B) exist in the portion surrounded by the broken line B3, which corresponds to "Partial area having ⅕ vertical size and ⅕ horizontal size of entire image at upper left corner of image", in the image 100B illustrated in FIG. 2B.

Accordingly, in Step S40, the image processing apparatus 10 extracts the character strings existing in the rectangular region surrounded by ruled lines or ruled lines and the periphery of the image. In Step S50, the image processing apparatus 10 determines that the orientation of the image 100B represented by the image information acquired in Step S10 is upside down because the direction of the extracted character strings are upside down.

The character strings "TITLE", "DRAW-01", and "B" existing in the portion surrounded by the broken line B3 in the image 100B illustrated in FIG. 2B face the same direction in the above example.

If the extracted character strings face different directions, the image processing apparatus 10 may determine the orientation of the image represented by the image information acquired in Step S10 on the basis of the direction of the character string (the character string "TITLE" in this example) existing in the largest rectangular region or may determine the orientation of the image represented by the image information acquired in Step S10 on the basis of the direction of the character string (the character string "DRAW-01" in this example) having the largest number of characters composing the character string.

The image processing apparatus 10 extracts a character string existing in a rectangular region in the partial area, which is specified on the basis of one area specification condition composing the area specification condition group and which is a part of the image in this example. However, if the image processing apparatus 10 does not extract a character string existing in a rectangular region in the partial area which is specified on the basis of all the area specification conditions composing the area specification condition group and which is a part of the image, the image processing apparatus 10 extracts a character string in a partial area including a central portion of the image (Step S21 and Step S41 in FIG. 5).

In Step S60, the image processing apparatus 10 may change the orientation of the image to the correct orientation on the basis of the result of the determination of the orientation of the image represented by the image information acquired in Step S10, which is acquired in Step S50.

In Step S70, the image processing apparatus 10 may update the image information concerning the image the orientation of which is changed to the correct orientation, which is changed in Step S60.

The image processing apparatus 10 is capable of accurately determining the orientation of the image, compared with the image processing apparatus that analyzes the entire image represented by the image information to determine the orientation of the image, as described above.

The image processing apparatus according to the exemplary embodiment of the present invention may be applied to, for example, a copier that outputs images represented by image information in a certain orientation, a scanner that stores image information concerning images in a certain orientation in a storage medium, an image processing apparatus that aligns the orientations of multiple images represented by image information to detect the difference between the multiple images, a facsimile that communicates image information concerning images in a certain orientation, and a multi-function peripheral.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus determining an orientation of an image according to acquired image information, the image processing apparatus having a processor configured to execute:
   an image information storage unit or an image reading unit configured to acquire image information;
   an input-output unit having a character string extracting unit configured to extract a character string existing in a rectangular region surrounded by ruled lines or ruled lines and a periphery of the image in a partial area that is a part of the image and meets a predetermined condition; and
   a computer program of the processor having an image orientation determining unit that determines an orientation of the image according to a direction of the character string extracted by the character string extracting unit,
   wherein the area specification condition group includes a first area specification condition that specifies a first partial area adjoining to a first corner among four corners of the image, a second area specification condition that specifies a second partial area adjoining to a second corner among the four corners of the image, a third area specification condition that specifies a third partial area adjoining to a third corner among the four corners of the image, and a fourth area specification condition that specifies a fourth partial area adjoining to a fourth corner among the four corners of the image, and
   wherein the partial area specifying unit specifies the first to fourth area specification conditions in a predetermined order until the character string extracting unit extracts a character string existing in a rectangular region in the partial area, which is specified according to the corresponding area specification condition and which is a part of the image.

2. The image processing apparatus according to claim 1, wherein the partial area specifying unit is configured to select an area specification condition from the area specification condition group according to a size of the image to specify the partial area, which is a part of the image.

3. The image processing apparatus according to claim 2, wherein the partial area includes a portion adjoining to one corner selected from four corners of the image.

4. The image processing apparatus according to claim 1, wherein the partial area includes a portion adjoining to one corner selected from four corners of the image.

5. The image processing apparatus according to claim 1, wherein, if the character string extracting unit cannot extract a character string existing in the rectangular region in the partial area in the image, the partial area specifying unit selects another area specification condition from the area specification condition group, specifies another partial area, which is a part of the image, according to the other area specification condition, and extracts a character string existing in a rectangular region in the other partial area.

6. The image processing apparatus according to claim 1, wherein, if the character string extracting unit cannot extract a character string existing in a rectangular region in partial areas, which are specified according to the area specification conditions composing the area specification condition group and which are part of the image, the character string extracting unit extracts a character string in a partial area including a central portion of the image.

7. The image processing apparatus according to claim 1, wherein the partial area includes a portion adjoining to one corner selected from four corners of the image.

8. The image processing apparatus according to claim 1, wherein, if a first character string facing a first direction and a second character string facing a second direction different from the first direction are extracted by the character string extracting unit, the image orientation determining unit determines the orientation of the image according to the respective directions of the first character string and the second character string.

9. A non-transitory computer readable medium storing a program causing a computer to execute a process comprising:
    acquiring image information of an image;
    using a first area specification condition that specifies a first partial area adjoining to a first corner among four corners of the image, a second area specification condition that specifies a second partial area adjoining to a second corner among the four corners of the image, a third area specification condition that specifies a third partial area adjoining to a third corner among the four corners of the image, and a fourth area specification condition that specifies a fourth partial area adjoining to a fourth corner among the four corners of the image,
    specifying the first to fourth area specification conditions in a predetermined order until the process identifies and extracts a character string existing in a rectangular region surrounded by ruled lines or ruled lines and a periphery of the image in a partial area that is a part of the image and that meets a predetermined condition; and
    determining an orientation of the image according to a direction of the extracted character string,
    wherein the extracting and the determining are executed by a processor.

10. The non-transitory computer readable medium according to claim 9, further including specifying a partial area according to an area specification condition selected from an area specification condition group composed of a plurality of predetermined area specification conditions; and
    extracting the character string in the partial area that is a part of the image as a result of determining that the character string exists.

11. An image processing method using a processor comprising:
    acquiring image information of an image;
    using a first area specification condition that specifies a first partial area adjoining to a first corner among four corners of the image, a second area specification condition that specifies a second partial area adjoining to a second corner among the four corners of the image, a third area specification condition that specifies a third partial area adjoining to a third corner among the four corners of the image, and a fourth area specification condition that specifies a fourth partial area adjoining to a fourth corner among the four corners of the image,
    using a processor to specify the first to fourth area specification conditions in a predetermined order until the processor identifies and extracts a character string a rectangular region surrounded by ruled lines or ruled lines and a periphery of the image in a partial area that is a part of the image and that meets a predetermined condition; and
    using a processor to determine an orientation of the image according to a direction of the extracted character string.

12. The image processing method according to claim 11, further comprising using the processor to specify a partial area according to an area specification condition selected from an area specification condition group composed of a plurality of predetermined area specification conditions;
    using a processor to extract a character string in the partial area that is a part of the image as a result of determining that the character string exists.

* * * * *